(12) United States Patent
Jia et al.

(10) Patent No.: US 10,592,127 B2
(45) Date of Patent: Mar. 17, 2020

(54) METHOD AND SYSTEM FOR ALLOCATING MIRRORED MEMORIES

(71) Applicant: EMC IP Holding Company LLC, Hopkinton, MA (US)

(72) Inventors: Ruiyong Jia, Beijing (CN); Jian Gao, Beijing (CN); Lifeng Yang, Beijing (CN); Xinlei Xu, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 7 days.

(21) Appl. No.: 15/623,427

(22) Filed: Jun. 15, 2017

(65) Prior Publication Data
US 2017/0364283 A1  Dec. 21, 2017

(30) Foreign Application Priority Data
Jun. 16, 2016 (CN) .......................... 2016 1 0431589

(51) Int. Cl.
*G06F 3/06* (2006.01)
*G06F 12/02* (2006.01)
*G06F 12/121* (2016.01)

(52) U.S. Cl.
CPC .......... *G06F 3/0617* (2013.01); *G06F 3/0631* (2013.01); *G06F 3/0689* (2013.01); *G06F 12/02* (2013.01); *G06F 12/121* (2013.01)

(58) Field of Classification Search
CPC . G06F 3/0631; G06F 12/0207; G06F 12/0607
USPC ......................................................... 711/147
See application file for complete search history.

(56) References Cited

U.S. PATENT DOCUMENTS

2008/0307160 A1* 12/2008 Humlicek ........... G06F 12/0804
                                                                711/113

* cited by examiner

*Primary Examiner* — Than Nguyen
(74) *Attorney, Agent, or Firm* — Brian J. Colandreo; Mark H. Whittenberger; Holland & Knight LLP

(57) ABSTRACT

A method and a system for managing memories in a storage system. In one embodiment of the present invention, there is provided a method for managing memories in a storage system comprising a first controller and a second controller. The method comprising: receiving an allocation request from a second controller in the storage system, where the allocation request requires to allocate available storage spaces from a first memory in the storage system to a second memory in the storage system for use by the second controller; and determining a candidate number of available storage spaces to be allocated from the first memory to the second memory based on first use status of the first memory, wherein the first memory and the second memory are associated with the first controller and the second controller respectively, and the first memory and the second memory are mirrored memories.

18 Claims, 7 Drawing Sheets ical solution can be compatible with existing storage systems and manage storage areas in the storage system with higher efficiency where no extra hardware device has to be added to existing storage systems.
METHOD AND SYSTEM FOR ALLOCATING MIRRORED MEMORIES

RELATED APPLICATIONS

This application claim priority from Chinese Patent Application Number CN201610431589.X, filed on Jun. 16, 2016 at the State Intellectual Property Office, China, titled "METHOD AND SYSTEM FOR MANAGING MEMORY IN STORAGE DEVICE" the contents of which is herein incorporated by reference in its entirety.

FIELD

Various embodiments of the present invention relate to storage management, and more specifically, to a method and a system for managing memories in a storage system (e.g. Redundant Array of Independent Disks, RAID).

BACKGROUND

With the development of data storage techniques, various data storage devices now provide users with higher data storage capacity, and also their speed of accessing data has been increased greatly. Besides the increase of data storage capacity, users also impose greater and greater demands on data reliability and response time of storage systems. So far various RAID-based data storage systems have been developed to increase data reliability. When one or more disks in a storage system fail, data in failing disks can be recovered from data in other disks operating normally.

The storage system may be accessed via storage control nodes. In a typical active-active type of storage system, two storage node controls work jointly to process data access operations on the storage system and further provide higher availability and better performance. Each storage control node has its own memory (e.g. cache), and memories in two storage controllers operate in a mirroring mode. The two storage control nodes may concurrently receive data access instructions from the outside. At this point, it becomes a focus of research regarding how to ensure the scheduling of available storage spaces of memories in the two storage control nodes.

SUMMARY

Therefore, it is desirable to develop and implement a technical solution for effectively managing mirrored memories in storage control nodes and further improving access performance of a storage system. It is desired that the technical solution can be compatible with existing storage systems and manage storage areas in the storage system with higher efficiency where no extra hardware device has to be added to existing storage systems.

In one embodiment of the present invention, there is provided a method for managing memories in a storage system comprising a first controller and a second controller, the method comprising: receiving an allocation request from a second controller in the storage system, where the allocation request requires to allocate available storage spaces from a first memory in the storage system to a second memory in the storage system for use by the second controller; and determining the candidate number of available storage spaces to be allocated from the first memory to the second memory based on first use status of the first memory, where the first memory and the second memory are associated with the first controller and the second controller respectively, and the first memory and the second memory are mirrored memories.

In one embodiment of the present invention, there is provided a system for managing storage areas, the system, comprising: one or more processors; a memory coupled to at least one processor of the one or more processors; computer program instructions stored in the memory which, when executed by the at least one processor, cause the system to execute a method for managing memories in a storage system comprising a first controller and a second controller, the method comprising: receiving an allocation request from a second controller in the storage system, where the allocation request requires to allocate available storage spaces from a first memory in the storage system to a second memory in the storage system for use by the second controller; and determining the candidate number of available storage spaces to be allocated from the first memory to the second memory based on first use status of the first memory, where the first memory and the second memory are associated with the first controller and the second controller respectively, and the first memory and the second memory are mirrored memories.

In one embodiment of the present invention, there is proposed an apparatus for managing memories in a storage system comprising a first controller and a second controller, the apparatus comprising: a receiving module configured to receive an allocation request from a second controller in the storage system, where the allocation request requires to allocate available storage spaces from a first memory in the storage system to a second memory in the storage system for use by the second controller; and a determining module configured to determine the candidate number of available storage spaces to be allocated from the first memory to the second memory based on first use status of the first memory, where the first memory and the second memory are associated with the first controller and the second controller respectively, and the first memory and the second memory are mirrored memories.

With the technical solution of the present invention, mirrored memories in storage control nodes may be managed effectively, response time of a storage system decreased, and further access efficiency of the storage system improved.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
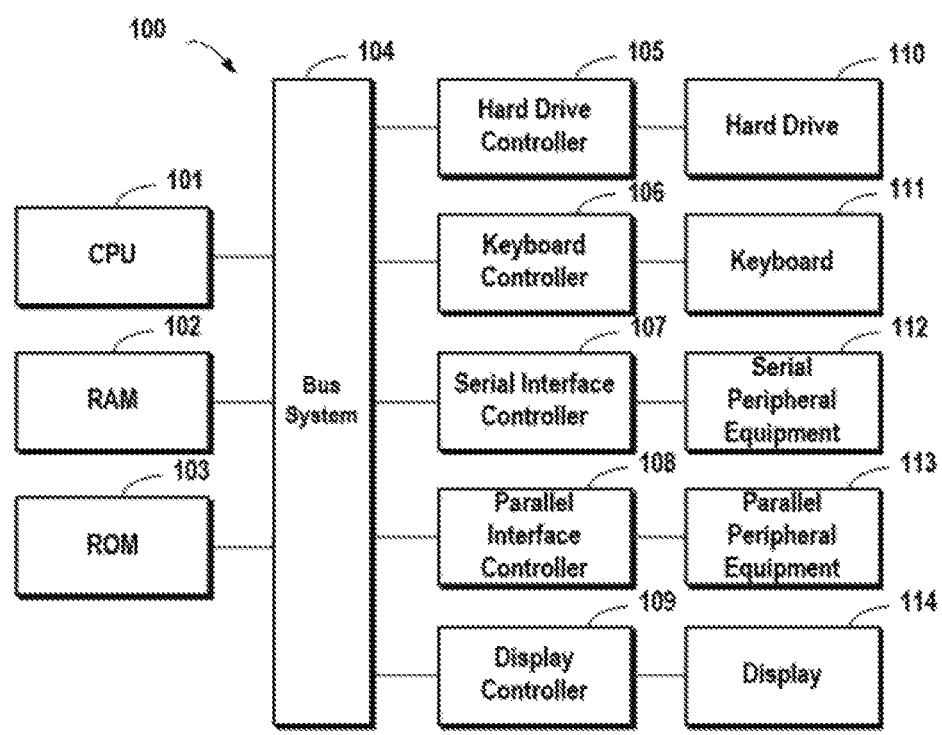
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium, A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Description is presented below to specific implementation of the various embodiments of the present invention by taking RAID as an example of storage systems. RAID may combine multiple storage devices into an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. With the development of storage devices, RAID has gone through a number of standards, such as RAID-1, RAID-2, RAID-3. RAID-4, RAID-5, RAID-6, RAID-10, RAID-50, etc. The operating system may regard a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent when some disks are broken.

Figure 2:
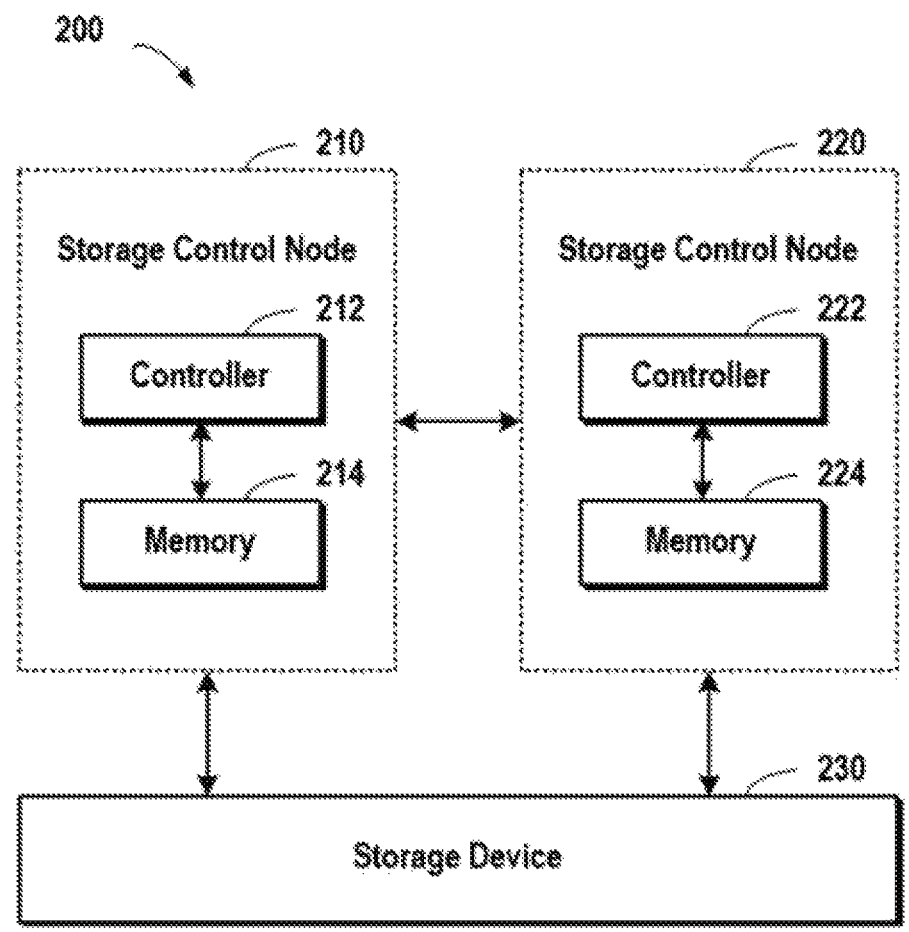
FIG. 2 schematically illustrates a structure schematic view of a storage system according to one technical solution.

FIG. 2 schematically illustrates a structural schematic view of a storage system 200 according to one technical solution. As shown in FIG. 2, storage system 200 may provide data access service to the outside via one or more storage control nodes. In this example, the storage system 200 may comprise storage control nodes 210 and 220. During operation of the storage system 200, the two storage control nodes 210 and 220 may provide service to the outside in parallel. If one node fails, then the other node may continue working.

The storage control node 210 may comprise a controller 212 and a memory 214 (e.g. cache). When the storage control node 210 receives a data access request from the outside, the controller 212 processes the request and looks up in the memory 214 whether data associated with the request has been loaded to the memory 214 or not. If relevant data has been loaded, then the control node 210 may continue executing the data access request; if no relevant data exists in the memory 214, then a corresponding available storage space has to be allocated in the memory 214 for executing the request.

Similarly, the other storage control node 220 also comprises a controller 222 and a corresponding memory 224, and operates in a manner similar to that of the storage control node 210. The two storage control nodes 210, 220 may operate in parallel for processing different access requests. Note the memories 214 and 224 shown in FIG. 2 are mirrored memories, and data in corresponding mirrored pages comprised in the two memories corresponds to each other. Specifically, if the controller 210 modifies data (status of which storage page is "dirty") in storage page A in the memory 214 during processing the write operation, then content of the "dirty" data needs to duplicated to mirrored page A' in the other memory 224 which corresponds to storage page A, so as to ensure the consistency of data in the two memories 214 and 224.

As the two memories 214 and 224 in the storage system 200 are mirrored memories, when the controllers 212 and 222 simultaneously respond to external read and write requests, available storage spaces in the mirrored memories might be made inadequate. So far there have been proposed technical solutions for reclaiming storage spaces in memories. According to one technical solution, reclaiming of storage spaces may be invoked periodically so as to release storage spaces that are no longer needed. However, this technical solution is mainly applied to storage systems having a single storage control node: when the technical solution is used for reclaiming storage spaces in mirrored memories, frequent data exchanges are required between two controllers, so extra communication overheads will be incurred.

In a storage system comprising a first controller and a second controller, the two controllers share storage spaces in mirrored memories (a first memory and a second memory). Based thereon, one embodiment of the present application proposes a method for managing memories in a storage system, where the storage system comprises a first controller and a second controller. The method comprising: receiving an allocation request from the second controller in the storage system, where the allocation request requires to allocate available storage spaces from a first memory in the storage system to a second memory in the storage system, for use by the second controller; and based on first use status of the first memory, determining a candidate number of available storage spaces to be allocated from the first memory to the second memory, where the first memory and the second memory are associated with the first controller and the second controller respectively, and the first memory and the second memory are mirrored memories.

Figure 3:
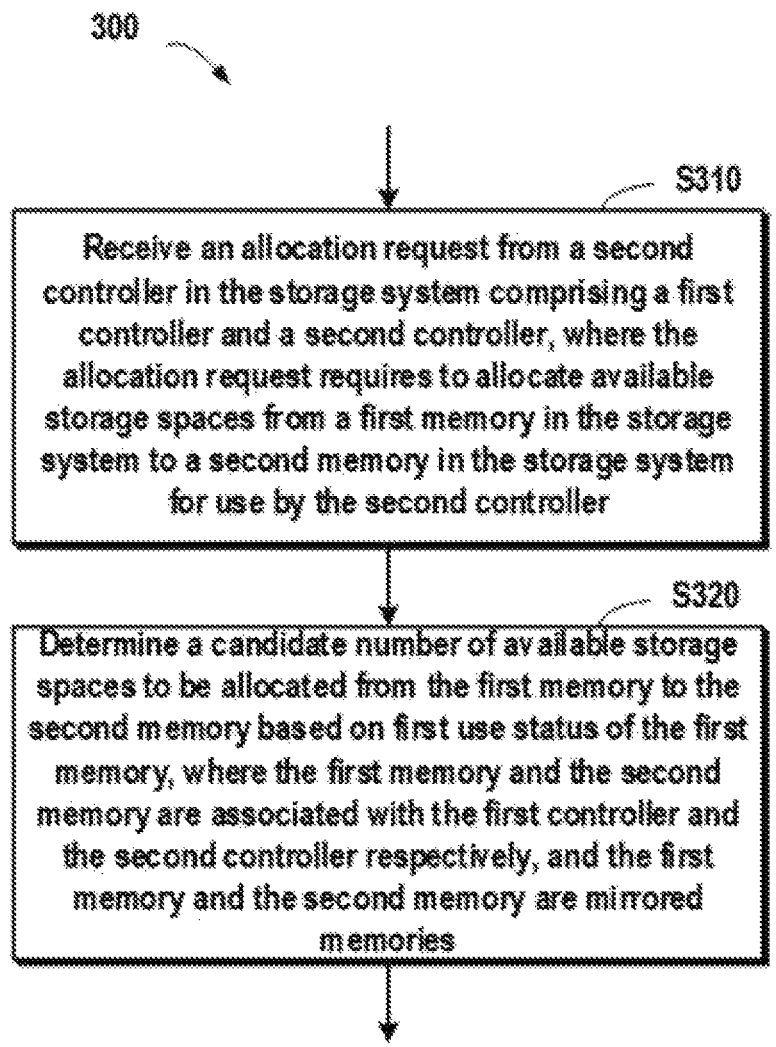
FIG. 3 schematically illustrates a flowchart of a method for managing memories in a storage system according to one embodiment of the present invention.

FIG. 3 schematically shows a flowchart 300 of a method for managing memories in a storage system according to one embodiment of the present invention. In step S310, in a storage system comprising a first controller and a second controller, an allocation request is received from the second controller in the storage system. The allocation request requires to allocate available storage spaces from a first memory in the storage system to a second memory in the storage system, for use by the second controller. The operation flow of the present invention is initiated in response to an allocation request from a controller (e.g., the second controller as shown in FIG. 3). In this step, the allocation request may be issued in response to the occurrence of inadequate available storage spaces in the second memory, or may be issued in response to other conditions.

In step S320, based on first use status of the first memory, the candidate number of available storage spaces to be allocated from the first memory to the second memory is determined, where the first memory and the second memory are associated with the first controller and the second controller respectively, and the first memory and the second memory are mirrored memories. In this step, upon receiving the allocation request, use status of the first memory may be checked, and further how to respond to the received allocation request is, determined. For example, if the first memory itself runs short of available storage spaces, then the received allocation request may be rejected; if there are abundant available storage spaces in the first memory, then a certain number of available storage spaces may be allocated to the second memory.

Figure 4:
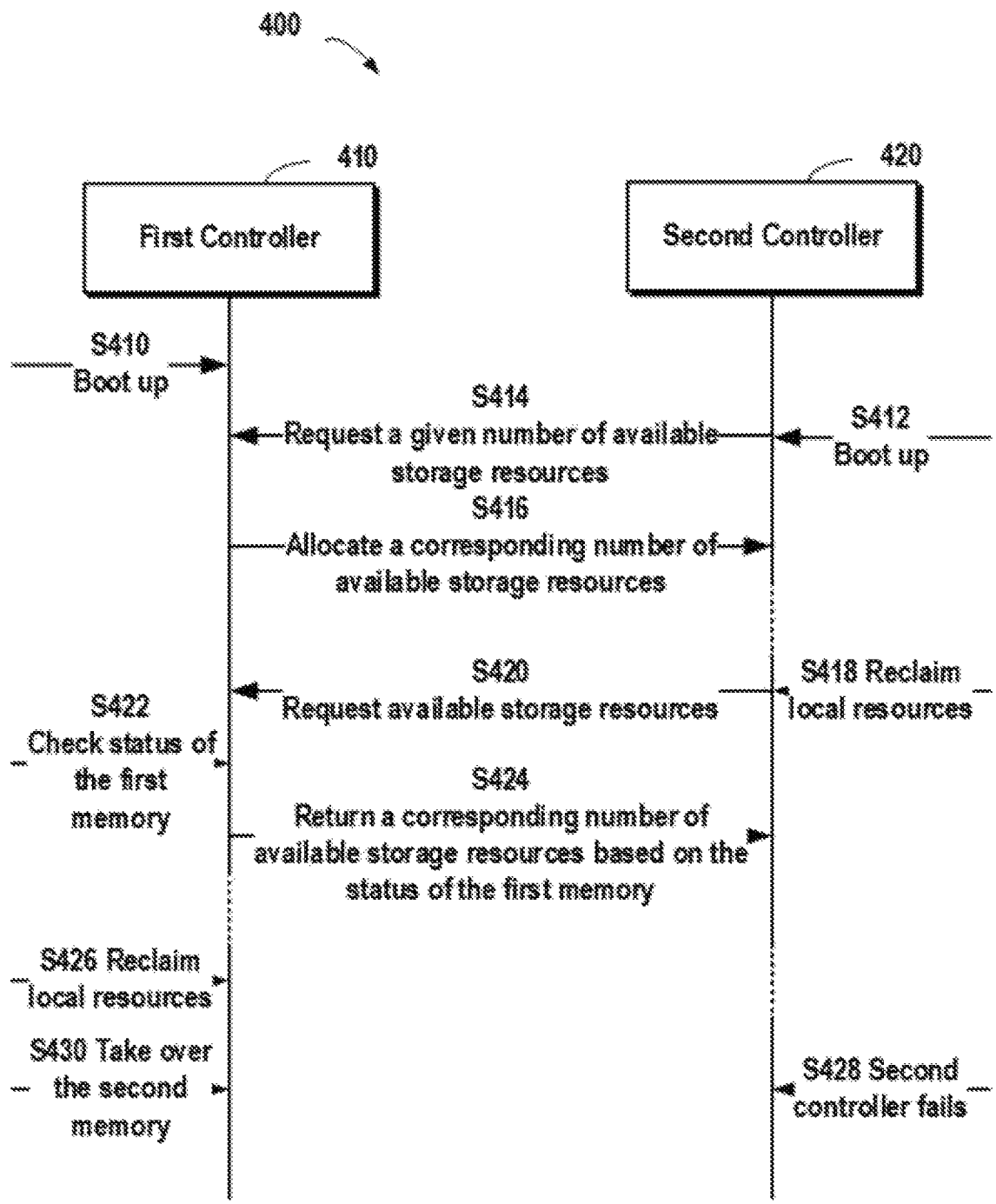
FIG. 4 schematically illustrates a sequence diagram of a method for managing memories in a storage system according to one embodiment of the present invention.

With reference to FIG. 4, description is presented below to a concrete example regarding how two storage control nodes manage available storage spaces in memories during operation of a storage system. FIG. 4 schematically shows a sequence diagram 400 of a method for managing memories in a storage system according to one embodiment of the present invention. A first controller 410 and a second controller 420 are controllers in two storage control, nodes in a storage system and are associated with a first memory and a second memory respectively, and the first memory and the second memory are mirrored memories.

As shown in FIG. 4, steps S410 to S416 show an operation flow during bootup of the storage system. As shown in step S410, first controller 410 boots up during initialization of the storage system, and then throughout step S410 the first controller 410 will occupy all storage spaces in mirrored memories. Next in step S412, the second controller boots up; since all storage spaces are already allocated to the first controller 410 in step S410, at this point the second controller 420 has to request the allocation of available storage spaces to itself in step S414 (e.g., storage spaces that are "high" in number). In step S416, a given number of storage spaces are allocated to the second controller 420. Since the storage system just boots up, there are adequate available storage spaces in the second memory, and the requested number of available storage spaces may be allocated to the second controller 420.

Steps S418 to S424 show the procedure that the second controller 420 reclaims local resources and requests resources to the first controller 410. After the booting up stage, the first controller 410 and the second controller 420 may serve data access requests from the outside. After a while, for example, the shortage of available storage spaces first occurs in the second memory associated with the second controller 420, and then the reclaiming operation may be initiated to reclaim storage spaces in the second memory (step S418). Subsequently or simultaneously, in step S420 available storage spaces may be requested from the first memory. In step S422, use status of the first memory may be checked. Next in step S424, based on the use status of the first memory, the candidate number of available storage spaces to be allocated from the first memory to the second memory is determined, and then the allocation is performed.

Steps S426 to S430 show other possible operations during the operation of the storage system. Two controllers may concurrently process data access requests from the outside, and when the shortage of storage spaces occurs in any memory, the reclaiming of local resources may be initiated (for example, shown in step S426). Additionally, allocation of storage spaces may further be requested from the other memory (not shown in FIG. 4). When one controller (e.g., the second controller 420) fails (step S428), then the other controller (e.g., the first controller 410) may take over a memory associated with the failing controller.

Note what is shown above with reference to FIG. 4 is merely one specific example of steps during the operation of the storage system; in other embodiments, more or less steps than shown in FIG. 4 may be comprised, and steps shown in FIG. 4 may occurs in a different order. In addition, the first controller and the second controller shown in FIG. 4 may exchange; for example, when the first memory associated with the first controller runs short of available storage spaces, the first controller 410 may send an allocation request to the second controller 420. Furthermore, although step S416 shows the situation in which the "high" number of storage spaces are allocated, in other embodiments a given number of available storage spaces may further be allocated to the second memory based on status of the first memory.

Figure 5:
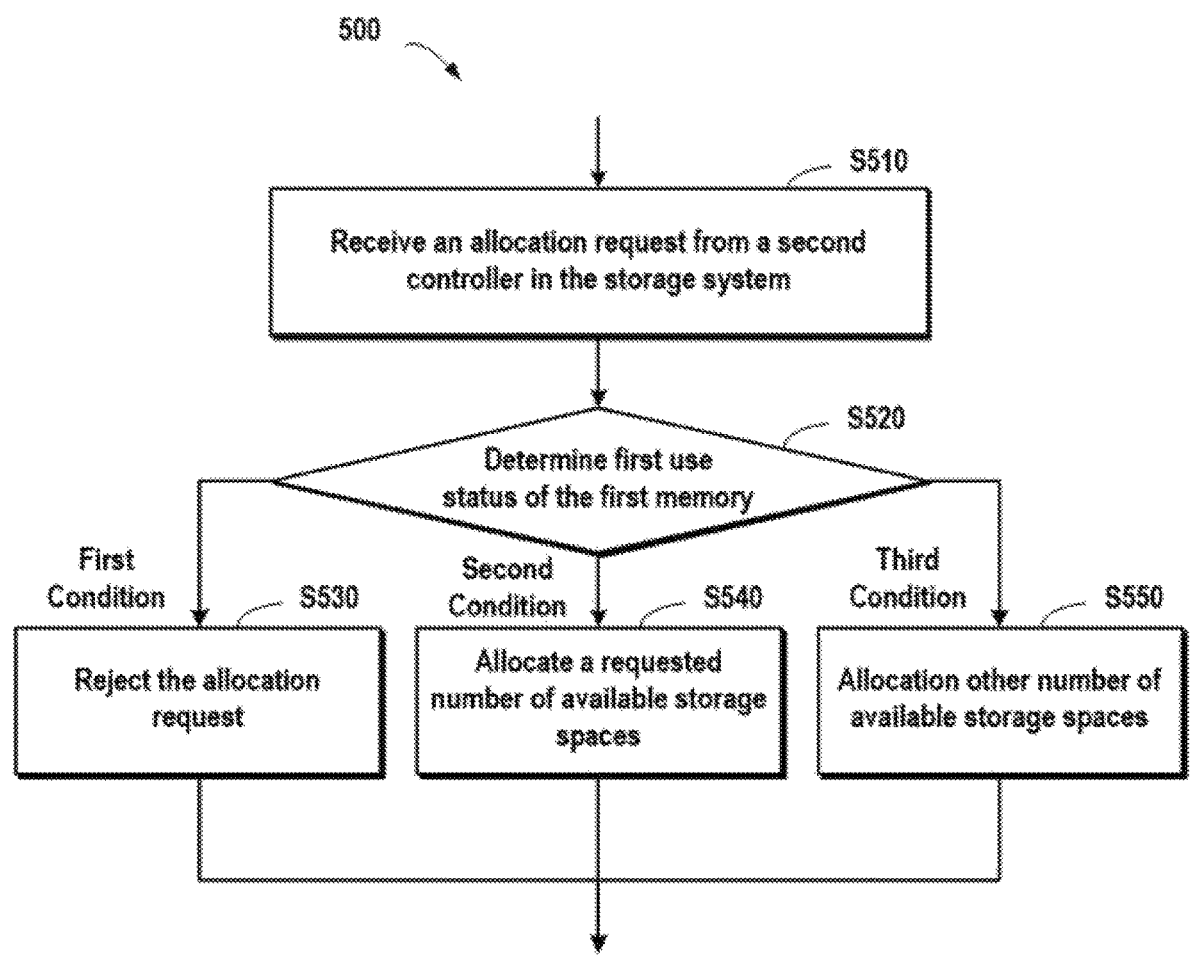
FIG. 5 schematically illustrates a flowchart of a method for managing memories in a storage system according to one embodiment of the present invention.

With reference to FIG. 5, detailed description is presented below to how to determine, based on status of one memory, the number of available storage spaces to be allocated to the other memory. FIG. 5 schematically shows a flowchart 500 of a method for managing memories in a storage system according to one embodiment of the present invention. Specifically, the figure shows a situation in which the second memory runs short of available storage spaces and the second controller requests to allocate available storage spaces to the second memory. In step S510, an allocation request is received from the second controller in the storage system. In step S520, first use status of the first memory is determined. In steps S530 to S550, different responses are made in response to the first use status satisfying different conditions (for example, the first condition, second condition and third condition).

In one embodiment of the present invention, the determining, based on the first use status of the first memory, the candidate number of available storage spaces to be allocated from the first memory to the second memory comprises: in response to the first use status indicating available spaces in the first memory satisfy a first condition, determining the candidate number to be zero.

Concrete steps of this embodiment are as shown in FIG. 5. In response to determining the first use status of the first memory satisfies a first condition, the request for resource allocation is rejected in step S530. The first condition here may be any condition indicating that the first memory itself runs short of available resources or indicating that there are no more available storage resources in the first memory to be allocated to the second memory. In particular, a predefined threshold may be set; when the number of available storage spaces in the first memory falls below the threshold, then the allocation request received in the previous step is rejected.

In one embodiment of the present invention, a concrete threshold may be defined with respect to the first condition. For example, a threshold "Low" may be defined to indicate whether local available storage spaces in the first memory run short or not. If the number of local available storage spaces in the first memory is less than (or less than or equal to) the threshold "Low," this means shortage. Those skilled in the art may give a concrete numerical value for Low. As one example, the numerical value may be denoted by a percentage of overall storage spaces of the first memory. For example, "Low" may be defined as any numerical value between 5% and 10% or may be defined as other numerical value. As one example, the value of "Low" may further be defined in the form of absolute value. For example, when the memory is 1 GB, "Low" may be defined as 50 MB to 100 MB. Or those skilled in the art may further use other approach to defining the first condition, so long as the first condition can indicate there is a shortage of available storage spaces in the first memory.

In one embodiment of the present invention, the allocation request comprises the desired number of available storage spaces to be allocated, and where the determining, based on the first use status of the first memory. The candidate number of available storage spaces to be allocated from the first memory to the second memory comprises: in response the first use status indicating that available spaces in the first memory satisfy a second condition, setting the candidate number as the desired number.

Concrete steps of this embodiment are as shown in FIG. 5. In response to determining the first use status of the first memory satisfies a second condition, a requested number of available storage spaces are allocated to the second memory in step S540. The second condition here may be a signal indicating that there are adequate storage spaces in the first memory itself, or any condition indicating that there are available storage spaces in the first memory to be allocated to the second memory. Specifically, a predefined threshold may be set; when the number of available storage spaces in the first memory is above the threshold, then a requested, number of available storage spaces are allocated to the second memory.

In one embodiment of the present invention, a concrete threshold may be defined with respect to the first condition. For example, a threshold "High" may be defined to indicate whether local available storage spaces in the first memory are adequate or not. If the number of local available storage spaces in the first memory is greater than (or greater than or equal to) the threshold "High," this means sufficiency. Those skilled in the art may give a concrete numerical value for "High." As one example, the numerical value may be denoted by a percentage of overall storage spaces of the first memory. For example, "High" may be defined as any numerical value between 15% and 20% or may be defined as other numerical value. As one example, the value of "High" may further be defined in the form of absolute value. For example, when the memory is 1 GB, "High" may be defined as 150 MB to 200 MB. Or those skilled in the art may further use other approach to defining the second condition, so long as the second condition can indicate there are adequate available storage spaces in the first memory.

In one embodiment of the present invention, the determining, based on the first use status of the first memory, the candidate number of available storage spaces to be allocated from the first memory to the second memory comprises: in response the first use status indicating that available spaces in the first memory satisfy a third condition, determining the shortage degrees of available spaces in the first memory and the second memory; and based on the shortage degrees of the available spaces, setting the candidate number.

Concrete steps of this embodiment are as shown in FIG. 5. In response to determining the first use status of the first memory satisfies a third condition, available storage spaces are allocated to the second memory in step S550. The third condition here may indicate that available storage resources in the first memory, though not quite adequate, are far from inadequate. Therefore, in this case a given number of available storage spaces may be allocated to the second memory in view of the situation in the first memory. Specifically, a predefined threshold range may exist: when the number of available storage spaces in the first memory satisfies the threshold range, a given number of available storage spaces may be allocated to the second memory.

In this embodiment, the third condition may be defined as a situation in which available storage spaces in the first memory range between "High" and "Low." For example, if High=20% and Low=10%, then the third condition may be defined as below: available storage spaces in the first memory are less than 20% and greater than 10%. In one embodiment of the present invention, other concrete numerical value may further be defined for the third condition, so long as the third condition may indicate there are a given number of available storage spaces in the first memory for allocation to the second memory.

Specifically, in this embodiment indicators of shortage degrees of available resources in the first memory and the second memory may be determined (e.g., denoted by IndicatorA and IndicatorB respectively), and it is determined based on the indicators how many available resources spaces are to be allocated from the first memory to the second memory. Those skilled in the art may use different indicators to represent a shortage degree of resources, for example, simply use the numbers of available resources in the first memory and the second memory as the shortage degree. In this step, for example, there are IndicatorA available storage spaces in the first memory, and there are IndicatorB available storage spaces in the second memory. When the second controller issues an allocation request, if IndicatorA≤IndicatorB, then the allocation request is rejected. If IndicatorA>IndicatorB, then it is determined based on indicators of resource shortage degrees in the two memories how many storage spaces are to be allocated to the second memory. For example, (IndicatorA-Low) available storage spaces may be allocated between the first memory and the second memory based on a proportional relation.

For example, a number of available storage spaces are retained in the first memory:

$$(IndicatorA - \text{Low}) * \frac{IndicatorB}{IndicatorA + IndicatorB} \qquad \text{Equation 1}$$

A number of available storage spaces are allocated from the first memory to the second memory:

$$(IndicatorA - \text{Low}) * \frac{IndicatorA}{IndicatorA + IndicatorB} \qquad \text{Equation 2}$$

Alternatively, an allocation proportion available storage spaces may further be calculated based on other equations. Those skilled in the art may design specific calculation equations in view of application environments. For example, suppose the second controller is mainly responsible for processing data access requests with higher real time, and then more available storage resources may be allocated to the second memory at this point.

Above Equations 1 and 2 schematically show the method for scheduling according to the numbers of available storage spaces in two memories. During real operation of the storage system, the numbers of data access requests received by two storage control nodes might not be even. Hence, there might exist a situation as below: there are less available storage spaces at one storage control node, whereas the storage control node has not received any data access request for quite a long time; although the other storage control node has more available storage spaces therein, it has received a large number of data access requests, and current available storage spaces will run out soon.

In view of the foregoing situation, the embodiments of the present invention further propose a technical solution for determining the allocation of available storage resources according to data access requests received by various controllers. In one embodiment of the present invention, the determining shortage degrees of available spaces in the first memory and the second memory comprises: determining the shortage degrees of available spaces in the first memory according to data access requests with respect to the storage system as received by the first controller; and determining the shortage degree of available spaces in the second memory according to data access requests with respect to the storage system as received by the second controller.

In this embodiment, the shortage degree of available storage spaces may be determined simply according to information on data access requests received by various controllers. Specifically, statistics may be made regarding the numbers of data access requests received by various controllers in a specific time period, whether various data access requests have to wait, wait time for various data access requests, and other information; the shortage degree of available storage spaces is measured based thereon.

In this embodiment, statistical values may be added up as a final indicator of the shortage degree. For example, suppose the first controller has received 20 data access requests in the last 10 minutes, then 20 may be used as an indicator of the shortage degree at the first controller. Alternatively, the "decaying averages" algorithm may be introduced, i.e., a lower weight is assigned to a statistical value that is far from current time, and a higher weight is assigned to a statistical value that is close to current time. Specifically, for example, a weight for the past 10 to 5 minutes may be set as 1, and a weight for the past 5 to 0 minutes may be set as 2. In this way, if the numbers of data access requests received during these two time periods are both 10, then a final indicator of the shortage degree=10*1+10*2=30.

For another example, statistics may be made only on the number of data access requests that have to wait, and the number of data access requests that are immediately processed without wait may be neglected. Specifically, suppose 10 requests have been received in the past 10 to 5 minutes, among which 5 requests have to wait and are not processed immediately; 10 requests have been received in the past 5 to 0 minutes, among which 5 requests have to wait. Continue the foregoing example; where the "decaying averages" algorithm is adopted, the final indicator of the shortage degree=5*1+5*2=15.

Note a concrete example of calculating an indicator of the shortage degree has been described above for illustration only. In other embodiments, the wait time of a request may further be measured, and those skilled in the art may design concrete calculation equations based on the principles of the present invention. For example, weights used for different time periods may be set based on concrete application environments, or other algorithm may be used to obtain an indicator of the resource shortage degree.

In one embodiment of the present invention, there is further comprised: allocating the candidate number of available storage spaces from the first memory to the second memory. Description has been presented above to how to calculate the number of available storage spaces to be allocated from the first memory to the second memory; after determining the number of storage spaces to be allocated, storage spaces in this number may be allocated to the second memory.

In one embodiment of the present invention, the allocation request is issued in response to available storage spaces in the second memory being lower than a first threshold. In this embodiment, there is no need to periodically invoke the release of storage spaces as the prior art, but the method for managing storage spaces according the present invention wakes up only when available storage spaces in the memory are inadequate (e.g., lower than the first threshold). In this way, on the one hand workloads caused by periodical release may be reduced; on the other hand, when storage spaces are inadequate, local storage spaces may be released in advance and/or available storage spaces may be requested from the other memory, and further the number of available storage spaces is maintained in adequate state.

Figure 6:
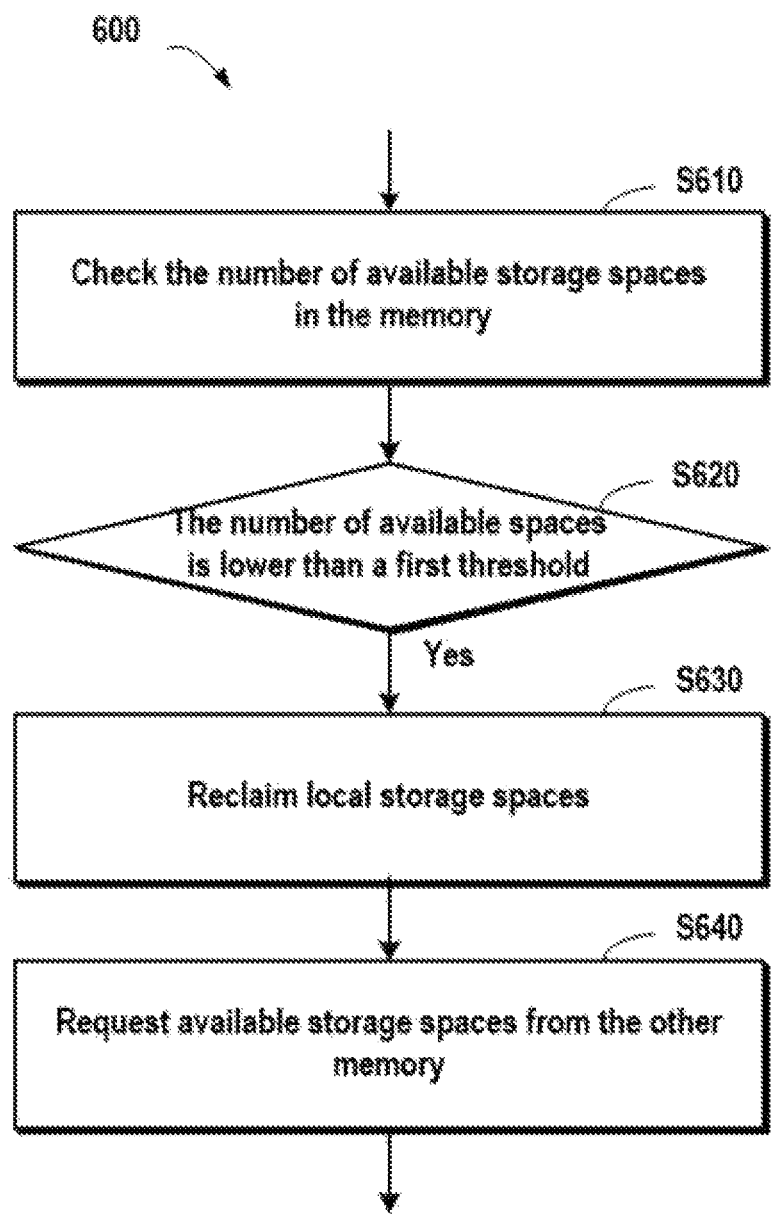
FIG. 6 schematically illustrates a flowchart of a method for managing memories in a storage system according to one embodiment of the present invention.

FIG. 6 schematically shows a flowchart 600 of a method for managing memories in a storage system according to one embodiment of the present invention. The method as shown in FIG. 6 is suitable to be executed at any storage control node in the storage system, i.e., may be executed either at the first storage control node or at the second storage control node. Specifically, FIG. 6 is depicted by taking the first storage control node as an example. In step S610, the number of available storage spaces in the first memory is detected. In step S620, when it is detected that available storage spaces in the first memory are lower than the first threshold (e.g., the value of "High"), then the operation proceeds to steps S630 and S640. In these steps, local storage spaces may be reclaimed, and alternatively and/or additionally, a request may be issued to the other memory. Those skilled in the art may appreciate although steps S630 and S640 are shown in order in FIG. 6, in specific application environments the two steps may be executed in the reverse order or may further be executed in parallel.

In one embodiment of the present invention, there is further comprised: in response to the second controller being offline, taking over storage spaces in the second memory. In this embodiment, when either of the two controllers fails and gets offline, the other controller operating normally may take over a memory associated with the offline controller. Specifically, when the second controller gets offline, the first controller may take over storage spaces in the second memory. At this point, neither of the first memory and the second memory is a mirrored memory any longer, but they operate like a conventional memory. Note although description is presented above to the situation that only the second controller gets offline, when the first controller gets offline, the second controller may take over storage spaces in the first memory.

In one embodiment of the present invention, when the offline controller is restarted and connected to the storage system again, the restarted controller may request the normally operating controller to allocate storage spaces (e.g., the number of "High"). Subsequently the normally operating controller may determine how many available storage spaces are to be allocated to the restarted controller according to the above method.

When a shortage of available storage spaces occurs in either memory, on the one hand available storage spaces may be requested from the other memory, and on the other hand local storage spaces in the current memory may further be reclaimed. Detailed description is presented below to how to reclaim local storage spaces. In one embodiment of the present invention, there is further comprised: in response to the first use status indicating that available storage spaces in the first memory are lower than a first threshold, determining status of a storage page in occupied spaces in the first memory; and releasing the storage page according to the status of the storage page. In this embodiment, when local available storage spaces in a memory are lower than the first threshold (e.g., the value of "High"), status of the local memory may be checked and storage spaces in the local memory that are no longer needed may be released. In this way, while requesting available storage spaces from the other memory, local storage spaces in the memory may further be released, so as to relieve the shortage of available resources in the memory.

In one embodiment of the present invention, the releasing the storage space according to the status of the storage space comprises any of: in response to the status of the storage pace being "clean," releasing the storage space; and in response to the status of the storage page being "dirty," flushing data in the storage page to a storage address in the storage system which corresponds to the storage page, and releasing the storage page.

When a storage page in the local storage space is "clean," it means that data in the storage page has been flushed to the disk, so the storage page may be released directly. When a storage page in the local storage space is "dirty," it means that data in the storage page has not been flushed to the disk.

At this point, first data in the storage page needs to be flushed to the disk, and then the reclaiming operation is executed. Throughout the context of the present invention, both the first memory and the second memory are mirrored memories, so a releasing algorithm has to be determined based on status of a storage page. In the mirrored memory, a storage page is a mirrored storage page. That is, one page in the first memory and a corresponding page in the second memory constitute one mirrored pair. In this embodiment, the releasing is executed with respect to mirrored storage pages in two memories.

By distinguishing between "clean" and "dirty" status to execute different reclaiming measurement, on the one hand the consistency between data in the memory and data in the disk may be ensured, and on the other hand storage spaces that are no longer needed may be reclaimed.

Figure 7:
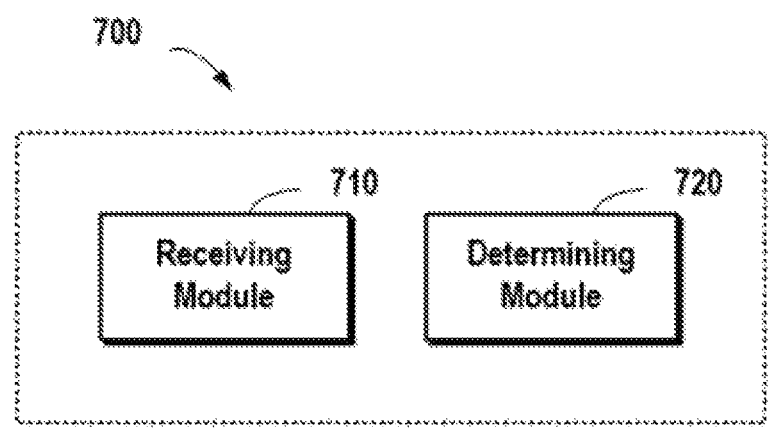
FIG. 7 schematically illustrates a block diagram of an apparatus for managing memories in a storage system according to one embodiment of the present invention.

FIG. 7 schematically shows a block diagram 700 of an apparatus for managing memories in a storage system according to one embodiment of the present invention. As shown in FIG. 7, there is proposed an apparatus for managing memories in a storage system comprising a first controller and a second controller, the apparatus comprising: a receiving module 710 configured to receive an allocation request from a second controller in the storage system, where the allocation request requires to allocate available storage spaces from a first memory in the storage system to a second memory in the storage system for use by the second controller; and a determining module 720 configured to determine a candidate number of available storage spaces to be allocated from the first memory to the second memory based on first use status of the first memory, where the first memory and the second memory are associated with the first controller and the second controller respectively, and the first memory and the second memory are mirrored, memories.

In one embodiment of the present invention, the allocation request is issued in response to available storage spaces in the second memory being lower than a first threshold.

In one embodiment of the present invention, the determining module comprises: a first determining module configured to determine the candidate number as zero in response to the first use status indicating that available spaces in the first memory satisfy a first condition.

In one embodiment of the present invention, the allocation request comprises the desired number of available storage spaces required to be allocated, and the determining module comprises; a second determining module configured to set the candidate number as the desired number in response to the first use status indicating that available spaces in the first memory satisfy a second condition.

In one embodiment of the present invention, the determining module comprises: a third determining module configured to determine shortage degrees of available spaces in the first memory and the second memory in response to the first use status indicating that available spaces in the first memory satisfy a third condition; and a third setting module configured to set the candidate number based on the shortage degree of available spaces.

In one embodiment of the present invention, the third determining module comprises: an extent determining module configured to determine a shortage degree of available spaces in the first memory according to data access requests on the storage system as received by the first controller; and determine a shortage degree of available spaces in the second memory according to data access requests on the storage system as received by the second controller.

In one embodiment of the present invention, there is further comprised an allocating module configured to allocate available storage spaces in the candidate number from the first memory to the second memory.

In one embodiment of the present invention, there is further comprised a takeover module configured to take over storage spaces in the second memory in response to the second controller being offline.

In one embodiment of the present invention, there are further comprised: a status determining, module configured to, in response to the first use status indicating that available storage spaces in the first memory are lower than a first threshold, determine status of a storage page in occupied spaces in the first memory; and a releasing module configured to release the storage page according to status of the storage page.

In one embodiment of the present invention, the releasing module is further configured to, in response to the status of the storage page being "clean," release the storage page; and in response to the status of the storage page being "dirty," flush data in the storage page to a storage address in the storage system which corresponds to the storage page, and release the storage page.

In one embodiment of the present invention, there is provided a system for managing storage areas, the system comprising: one or more processors; a memory coupled to at least one processor of the one or more processors; computer program instructions stored in the memory which, when executed by the at least one processor, cause the system to execute a method for managing memories in a storage system comprising a first controller and a second controller. The method comprises: receiving an allocation request from a second controller in the storage system, where the allocation request requires to allocate available storage spaces from a first memory in the storage system to a second memory in the storage system for use by the second controller; and determining a candidate number of available storage spaces to be allocated from the first memory to the second memory based on first use status of the first memory, where the first memory and the second memory are associated with the first controller and the second controller respectively, and the first memory and the second memory are mirrored memories.

In one embodiment of the present invention, the allocation request is issued in response to available storage spaces in the second memory being lower than a first threshold.

In one embodiment of the present invention, the computer program instructions, when executed by the at least one processor, further cause the system to: determine the candidate number as zero in response to the first use status indicating that available spaces in the first memory satisfy a first condition.

In one embodiment of the present invention, the allocation request comprises the desired number of available storage spaces required to be allocated, and the computer program instructions, when executed by the at least one processor, further cause the system to: set the candidate number as the desired number in response to the first use status indicating that available spaces in the first memory satisfy a second condition.

In one embodiment of the present invention, the computer program instructions, when executed by the at least one processor, further cause the system to: determine shortage degrees of available spaces in the first memory and the second memory in response to the first use status indicating that available spaces in the first memory satisfy a third condition; and set the candidate number based on the shortage degree of available spaces.

In one embodiment of the present invention, the computer program instructions, when executed by the at least one processor, further cause the system to: determine a shortage degree of available spaces in the first memory according to data access requests on the storage system as received by the first controller; and determine a shortage degree of available spaces in the second memory according to data access requests on the storage system as received by the second controller.

In one embodiment of the present invention, the computer program instructions, when executed by the at least one processor, further cause the system to: allocate available storage spaces in the candidate number from the first memory to the second memory.

In one embodiment of the present invention, the computer program instructions, when executed by the at least one processor, further cause the system to: take over storage spaces in the second memory in response to the second controller getting offline.

In one embodiment of the present invention, the computer program instructions, when executed by the at least one processor, further cause the system to: in response to the first use status indicating that available storage spaces in the first memory are lower than a first threshold, determine status of a storage page in occupied spaces in the first memory; and release the storage page according to status of the storage page.

In one embodiment of the present invention, the computer program instructions, when executed by the at least one processor, further cause the system to: in response to the status of the storage page being "clean," release the storage page; and in response to the status of the storage page being "dirty," flush data in the storage page to a storage address in the storage system which corresponds to the storage page, and release the storage page.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in, the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and, variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing memories in a storage system comprising a first controller and a second controller, the method comprising:
   receiving, at the first controller, an allocation request from a second controller in the storage system, the allocation request issued in response to available storage spaces in the second memory being lower than a first threshold, the allocation request requiring to allocate available storage spaces from a first memory in the storage system to a second memory in the storage system for use by the second controller; and
   determining a candidate number of available storage spaces to be allocated from the first memory to the second memory based on first use status of the first memory, wherein the first use status indicates that available spaces in the first memory satisfy one or more conditions,
   wherein the first memory and the second memory are associated with the first controller and the second controller respectively, and the first memory and the second memory are mirrored memories.

2. The method according to claim 1, wherein the determining the candidate number of available storage spaces to be allocated from the first memory to the second memory based on first use status of the first memory comprises:
   determining the candidate number as zero in response to the first use status indicating that available spaces in the first memory satisfy a first condition.

3. The method according to claim 1, wherein the allocation request comprises a desired number of available storage spaces required to be allocated, and the determining the candidate number of available storage spaces to be allocated from the first memory to the second memory based on first use status of the first memory comprises:
   setting the candidate number as the desired number in response to the first use status indicating that available spaces in the first memory satisfy a second condition.

4. The method according to claim 1, wherein the determining the candidate number of available storage spaces to be allocated from the first memory to the second memory based on first use status of the first memory comprises: in response to the first use status indicating that available spaces in the first memory satisfy a third condition,
   determining shortage degrees of available spaces in the first memory and the second memory; and
   setting the candidate number based on the shortage degrees of available spaces.

5. The method according to claim 4, wherein the determining shortage degrees of available spaces in the first memory and the second memory comprises:
   determining a shortage degree of available spaces in the first memory according to data access requests on the storage system as received by the first controller; and
   determining a shortage degree of available spaces in the second memory according to data access requests on the storage system as received by the second controller.

6. The method according to claim 1, further comprising:
   allocating available storage spaces in the candidate number from the first memory to the second memory.

7. The method according to claim 1, further comprising:
   taking over, via the first controller, storage spaces in the second memory in response to the second controller being offline, wherein taking over storage spaces in the second memory includes accessing data in the second memory via the first controller.

8. The method according to claim 1, further comprising: in response to the first use status indicating that available storage spaces in the first memory are lower than a first threshold,
 determining status of a storage page in occupied spaces in the first memory; and
 releasing the storage page according to status of the storage page.

9. The method according to claim 8, wherein the releasing the storage page according to status of the storage page comprises any of:
 in response to the status of the storage page being "clean," releasing the storage page; and
 in response to the status of the storage page being "dirty," flushing data in the storage page to a storage address in the storage system which corresponds to the storage page, and releasing the storage page.

10. A system for managing storage areas, the system comprising:
 one or more processors;
 a memory coupled to at least one processor of the one or more processors;
 computer program instructions stored in the memory which, when executed by the at least one processor, cause the system to execute a method for managing memories in a storage system comprising a first controller and a second controller, the method comprising:
 receiving, at the first controller, an allocation request from a second controller in the storage system, the allocation request issued in response to available storage spaces in the second memory being lower than a first threshold, the allocation request requiring to allocate available storage spaces from a first memory in the storage system to a second memory in the storage system for use by the second controller; and
 determining a candidate number of available storage spaces to be allocated from the first memory to the second memory based on first use status of the first memory, wherein the first use status indicates that available spaces in the first memory satisfy one or more conditions,
 wherein the first memory and the second memory are associated with the first controller and the second controller respectively, and the first memory and the second memory are mirrored memories.

11. The system according to claim 10, wherein the computer program instructions, when executed by the at least one processor, further cause the system to: determine the candidate number as zero in response to the first use status indicating that available spaces in the first memory satisfy a first condition.

12. The system according to claim 10, wherein the allocation request comprises a desired number of available storage spaces required to be allocated, and wherein the computer program instructions, when executed by the at least one processor, further cause the system to:
 set the candidate number as the desired number in response to the first use status indicating that available spaces in the first memory satisfy a second condition.

13. The system according to claim 10, wherein the computer program instructions, when executed by the at least one processor, further cause the system to: in response to the first use status indicating that available spaces in the first memory satisfy a third condition,
 determine shortage degrees of available spaces in the first memory and the second memory; and
 set the candidate number based on the shortage degrees of available spaces.

14. The system according to claim 13, wherein the computer program instructions, when executed by the at least one processor, further cause the system to:
 determine a shortage degree of available spaces in the first memory according to data access requests on the storage system as received by the first controller; and
 determine a shortage degree of available spaces in the second memory according to data access requests on the storage system as received by the second controller.

15. The system according to claim 10, wherein the computer program instructions, when executed by the at least one processor, further cause the system to:
 allocate available storage spaces in the candidate number from the first memory to the second memory.

16. The system according to claim 10, wherein the computer program instructions, when executed by the at least one processor, further cause the system to:
 take over, via the first controller, storage spaces in the second memory in response to the second controller being offline, wherein taking over storage spaces in the second memory includes accessing data in the second memory via the first controller.

17. The system according to claim 10, wherein the computer program instructions, when executed by the at least one processor, further cause the system to: in response to the first use status indicating that available storage spaces in the first memory are lower than a first threshold,
 determine status of a storage page in occupied spaces in the first memory; and
 release the storage page according to status of the storage page.

18. The system according to claim 17, wherein the computer program instructions, when executed by the at least one processor, further cause the system to:
 in response to the status of the storage page being "clean," release the storage page; and in response to the status of the storage page being "dirty," flush data in the storage page to a storage address in the storage system which corresponds to the storage page, and release the storage page.

* * * * *